May 28, 1968 R. LUCIEN ET AL 3,385,403

FORCE-LIMITING SHOCK ABSORBER

Filed July 11, 1966

United States Patent Office 3,385,403
Patented May 28, 1968

3,385,403
FORCE-LIMITING SHOCK ABSORBER
Rene Lucien, Neuilly-sur-Seine, Hauts-de-Seine, and Emile Tetart, Louvie Juzon, Basses-Pyrenees, France, assignors to Societe Anonyme dite: Messier, Paris, France,
Filed July 11, 1966, Ser. No. 564,271
Claims priority, application France, July 31, 1965, 26,834
9 Claims. (Cl. 188—88)

ABSTRACT OF THE DISCLOSURE

A shock-absorber having a diaphragm dividing a body containing a liquid into separate chambers, and an orifice of conical shape movably accommodating a conical part which is urged against an abutment to form an annular space with the diaphragm in the orifice which establishes communication between the chambers for the passage of liquid in streams to effect a viscous damping function, the movable body being displaced away from the abutment upon increase of pressure of the liquid to maintain a substantially constant damping effect.

---

It is known that automobile vehicles which are equipped with shock-absorbers acting to damp the oscillations of the vehicle, due to the inevitable and normal inequalities of the road surfaces, are nevertheless subjected to disturbing effects resulting from small oscillations of high frequency, which act on the non-suspended masses by imparting to them very high instantaneous speeds. In conventional shock-absorbers, these oscillations generate forces which are very short but of high intensity. These effects are disagreeably felt by the passengers and adversely affect the suspension.

It is also known to limit these phenomena by supplementing the main shock-absorber device with an auxiliary system comprising, at an appropriate point of the shock-absorber, a clapper-valve which is set to open in excess of a certain pressure. Technical literature describes various forms of construction of devices of this kind.

The present invention is concerned with the problem which has just been stated above.

In principle, the invention contemplates limiting the detrimental effects described by means of a viscous effect generated in a thin sheet of liquid comprised between two conical surfaces, these two surfaces being separated while at rest by an annular space, the dimensions of which are such that it ensures the damping of the oscillations of normal frequency of the device to be damped, for example a vehicle, and the said surfaces moving away from each other when they are subjected to pressures greater than the normal pressure corresponding to very high instantaneous speeds and to oscillations of high frequency, in such manner that the thickness of the thin film increases and the viscous braking of the damping liquid remains thus substantially the same in spite of the increase in speed.

Damping of this kind by the viscosity effect has appreciable advantages as compared with known systems. In fact, on the one hand it is proportional to the speed, and on the other it can be regulated, since its effectiveness is a function of the thickness of the liquid film and since this latter can itself be easily regulated in a manner which is described below. The device according to the invention has the further advantage of ensuring both the damping of normal oscillations and the damping of oscillations of high frequency.

The invention will be described below with reference to the accompanying drawings, which are given by way of non-limitative example, and in which.

Figure 1:
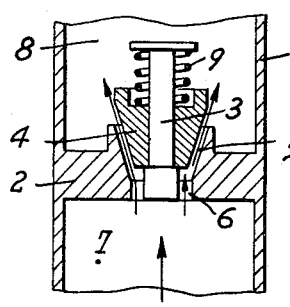
FIG. 1 is a diagrammatic sectional view illustrating the principle of operation of a force-limiting shock-absorber device according to the invention.

With reference to FIG. 1:

The body 1 of the shock-absorber is provided with a fixed diaphragm 2 on which is fixed a small rod 3, on which a shuttle 4 having a conical profile can slide with respect to a female seating 5 with a corresponding profile formed in the diaphragm. Orifices 6 are provided at the base of the diaphragm for the circulation of the damping liquid between the chambers 7 and 8, separated by the diaphragm.

The shuttle 4 is urged towards its seating by a spring 9, suitably calibrated with a view to the effect to be obtained, and is normally separated from this seating by an annular space intended to ensure the viscous damping of oscillations of ordinary frequency.

The operation of this device is effected as follows, it being assumed that the displacement of the liquid takes place in the direction of the arrow F.

As long as the pressure in the chamber 7 of the shock-absorber remains less than a pre-determined value, which corresponds to the speed which has been fixed as appropriate to the maximum permissible damping force, the spring 9, calculated to correspond to this force, holds the shuttle 4 applied against its seating 5, and the damping of the oscillations is effected by the passage of the damping liquid into the annular space separating the conical surfaces of the shuttle from its seating.

As soon as the pressure exceeds the limiting value considered, it causes the shuttle to lift above its seating and the viscous braking thus remains substantially the same in spite of the increase in pressure. It is clear that the damping can be pre-set by choosing in a suitable manner the apex angle of the conical surfaces of the shuttle and of the seating, and the strength of the spring.

Figure 2:
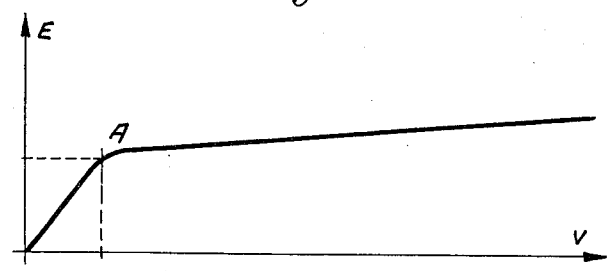
FIG. 2 shows a damping curve obtained with a shock-absorber of this kind.

FIG. 2 shows an example of a shock-absorbing curve obtained by the utilization of this device. In this curve, the speed V of the piston is plotted along the abscissae and the damping or shock-absorbing force E along the ordinate. The point A corresponds to the maximum speed. It can be seen that beyond this point, the damping force only increases to an extremely small extent, even for very high piston speeds.

The regulation of this damping curve can be obtained at the same time by the choice of the spring and the choice of the conical profile angle and the value of the clearance between the two co-operating conical surfaces.

The diagrammatic arrangement shown in FIG. 1 must naturally be completed by means for ensuring the return passage of the liquid from the chamber 8 to the chamber 7, but this device, described here in its application to the damping of compression serves equally well for damping the expansion.

Figure 3:
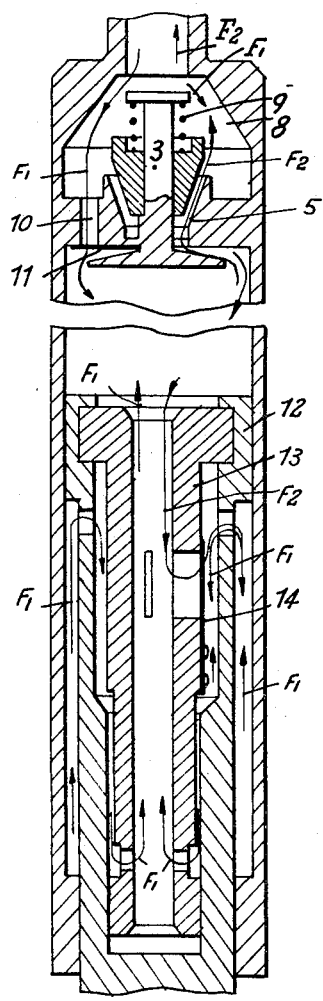
FIG. 3 is a partial longitudinal section of a first form of construction of a damping device according to the invention.

FIG. 3 shows by way of non-limitative example a first form of construction of a compression shock-absorber in accordance with the invention. In this figure, the parts already described in connection with FIG. 1 have been given the same reference numbers.

There are again found, as before, a shuttle 4 and a female seating 5 with complementary conical surfaces, and a calibrated spring 9 supported against an end flange on the rod 3 and tending normally to bring the shuttle into abutment with seating 5. In addition, orifices 10 formed in the diaphragm 2 and closed during compression by the clappers 11 put the chambers 7 and 8 into communication during the expansion stroke of the piston.

The chamber 8 communicates with an accumulator, for example an oleo-pneumatic accumulator (not shown), such as that of the suspension described in French Patent No. 1,360,210, filed on Mar. 2, 1963, in the name of the same applicants.

The shock-absorber further comprises a piston of the type described in French Patent No. 1,390,338, filed on Jan. 13, 1964, in the name of the same applicants.

This piston comprises essentially two parts 12 and 13, fixed with respect to each other, and forming two chambers in which the damping liquid flows and is withdrawn, both during compression and expansion. A clapper 14, open during compression and closed during the expansion stroke, compels the liquid to follow different paths during these two phases of damping.

Arrows having the references $F_1$ and $F_2$ indicate the paths followed by the liquid during expansion and during compression respectively.

In this form of embodiment, the device with conical surfaces acts as described previously with reference to FIG. 1, and ensures the entire damping action during compression, while during expansion the open clappers 11 permit the free passage of the damping liquid which comes from the accumulator, the piston effecting the damping as described in the above-mentioned French Patent No. 1,390,338.

Figure 4:
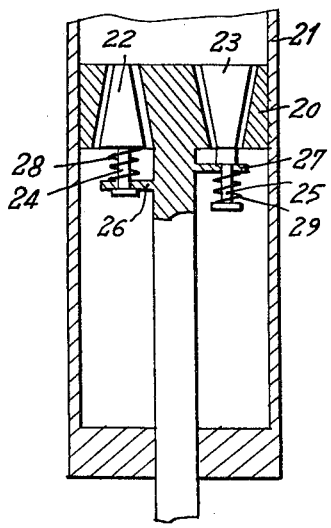
FIG. 4 is a partial longitudinal section of another form of construction.

FIG. 4 shows another type of shock-absorber comprising a double device according to the invention, arranged in the piston of the shock-absorber itself.

The piston 20 moving inside the body 21 replaces the diaphragm, in which are provided female seatings of conical profile for two shuttles 22 and 23 of corresponding shape, directed in opposite senses. The rods 24 and 25 of these shuttles slide in holes formed for that purpose in elements 26 and 27 rigidly fixed to the piston rod. These elements serve at the same time as abutments when the shuttles are in their extreme positions. Calibrated springs 28 and 29 return the shuttles to their positions of rest, at which they are separated from their seatings by an annular space which ensures the damping for normal speeds. This damping of oscillations of medium frequency is effected by the two annular spaces.

Above a pre-determined speed, one of the shuttles moves away from its seating so that the pressure remains substantially constant. In this case therefore, there is symmetrical viscous damping in both directions of flow of the shock-absorber liquid.

What we claim is:

1. A force limiting shock-absorber comprising a body containing a liquid, a diaphragm in said body dividing the same into two chambers, said diaphragm having an orifice providing communication between said chambers, a part having a conical external surface movably mounted in said orifice, said diaphragm having a surface in said orifice facing said body and of a conical shape having the same conicity of that of the external surface of said part, an abutment in said body engageable with said movable part for limiting movement thereof towards said orifice surface such that a thin calibrated annular passage is formed therebetween of substantially greater length than its radial thickness establishing communication between said chambers and through which liquid passes in calibrated streams and serves to effect a viscous damping function, and resilient means acting on said part to urge the same against said abutment, and permitting movement of said part under the pressure of the fluid to increase the radial thickness of the annular passage in graduated manner thereby to vary the viscous damping function.

2. A shock-absorber as claimed in claim 1 comprising a fixed rod rigidly fixed to said diaphragm, said part being movable along said rod.

3. A shock-absorber as claimed in claim 1 in which said means urging the part against the abutment is a spring which is calibrated to permit the movement of said part with respect to said orifice surface only when the speed of a piston of the absorber exceeds a predetermined value.

4. A shock-absorber as claimed in claim 1, in which said diaphragm has a further orifice, the absorber further comprising valve means associated with the latter orifice for uncovering the same during an expansion stroke of a piston in said absorber, and for closing the same during the compression stroke of the piston.

5. A shock-absorber as claimed in claim 1 comprising a piston in said body which effects damping during an expansion stroke, while the damping during the compression stroke is wholly insured by said moving part.

6. A shock-absorber as claimed in claim 1 comprising a movable piston in said body, said diaphragm constituting a part of said piston.

7. A shock-absorber as claimed in claim 1 comprising a movable piston in said body constituted by two parts secured together and defining chambers and passageways for the flow of liquid as the piston moves.

8. A force limiting shock-absorber comprising a body containing a liquid, a movable piston in said body dividing the body into two chambers, said piston having two orifices providing communication between said chambers, two parts of conical profile movably supported in respective orifices and having opposite directions of conicity, said orifices having surfaces facing the respective parts of conical profile of the same conicity, abutment means on said piston associated with said parts for limiting movement of said parts towards their respective facing surfaces such that thin calibrated annular passages are formed therebetween of substantially greater length than their radial thickness establishing communication between said chambers and through which spaces liquid passes in calibrated streams and serves to effect a viscous damping function for opposite direction of flow of the liquid between said chambers, and resilient means associated with the abutment means and said parts for urging the latter to their respective positions whereat they are limited by the abutment means, said resilient means permitting movement of said parts under the pressure of the fluid to increase the radial thicknesses of the annular spaces in graduated manner thereby to vary the viscous damping function.

9. A shock-absorber as claimed in claim 8 wherein said abutment means comprises fixed elements on said piston having holes therein, said parts including rods slidably mounted in the holes and having enlarged heads which are not passable through the holes, said resilient means urging the parts to their limit position comprising springs acting between the abutments and the parts.

References Cited

UNITED STATES PATENTS

| 2,500,708 | 3/1950 | Rossman | 188—96 X |
| 2,668,604 | 2/1954 | Chisholm | 188—100 |
| 2,809,825 | 10/1957 | Allinquant | 188—88 X |

FOREIGN PATENTS

| 1,037,209 | 8/1958 | Germany. |
| 1,146,765 | 4/1963 | Germany. |
| 479,856 | 4/1953 | Italy. |
| 11,921 | 6/1905 | Norway. |

MILTON BUCHLER, *Primary Examiner.*

FERGUS S. MIDDLETON, *Examiner.*

G. E. A. HALVOSA, *Assistant Examiner.*